2,857,361
ODOR IMPROVEMENT OF PETROLEUM RESINS WITH VANILLIN

William P. Fitz Gerald, Florham Park, Joseph F. Nelson, Westfield, and Ober C. Slotterbeck, Rahway, N. J., assignors to Esso Research and Engineering Company, a corporation of Delaware No Drawing. Application October 14, 1954
Serial No. 462,374

3 Claims. (Cl. 260—45.95)

This invention relates to a method for deodorizing petroleum resins and relates more particularly to a petroleum resin composition which contains an odor masking agent.

The preparation of resins by Friedel-Crafts polymerization of steam cracked petroleum fractions is well known. Such resins when freshly prepared are solid, light colored, and they possess a mild and generally acceptable odor. They are commercially useful in the preparation of paints and they find application as blending agents with other resins, natural and synthetic rubber, as well as paper impregnants and many other uses. However, when these resins are stored for any length of time an undesirable "burnt" peroxidized odor develops particularly when the resins are in flake form. Such odor development also occurs when the resin is melted for application to paper or paper board and the like.

According to the present invention the development of this "burnt" peroxidized odor is substantially completely overcome by the addition to the resin of a small amount of 4-hydroxy-3-methoxybenzaldehyde, better known as vanillin.

Hydrocarbon resins to which the present invention is applicable are made by treating a hydrocarbon mixture containing 10 to 35% diolefins and 30 to 65% olefins and 0 to 60% of aromatics, paraffins, and naphthenes with 0.25–2.5% of a Friedel-Crafts type catalyst such as aluminum chloride, aluminum bromide, boron trifluoride, and the like or solutions, slurries, or complexes thereof. The reactions are conducted at temperatures in the range of −100 to +100° C. (preferably −35 to +75° C.). Residual catalyst is quenched by suitable methods, such as addition of methyl alcohol and subsequent filtration, water and/or caustic washing and the final solution is then stripped of unreacted hydrocarbons and low molecular weight oils by vacuum and/or steam distillation. The product is a substantially non-aromatic unsaturated hydrocarbon resin. A hydrocarbon mixture suitable for resin production is conveniently found in hydrocarbon streams obtained by steam cracking gas oils. These streams have boiling ranges between 20° and 280° C., or may be composed of any intermediate fractions thereof. Preferred streams contain about 12 to 30% diolefins, 45 to 62% olefins, 0–36% aromatics, and 1 to 15% paraffins and naphthenes. A typical stream shows 20% diolefins, 51% olefins, 27% aromatics, and 2% paraffins and naphthenes. The preparation of these hydrocarbon resins is further described in co-pending patent application Serial No. 295,836, filed June 26, 1952, now Patent No. 2,698,841.

According to the preferred method of carrying out the invention, 0.02 to 1.0 wt. percent (preferably 0.05%) of vanillin is added to a hydrocarbon resin. As a result of this addition the odor of the resin is overcome and the mixture has substantially no odor or only a faint trace of vanillin odor. If antioxidants such as butyl hydroxy anisole are added the odor is even further reduced and practically disappears, even at 110° C., when butyl hydroxy anisole is used. The presence of 0.05–2 wt. percent antioxidant is effective.

The following example illustrates the benefits to be secured in accordance with the present invention:

Example I

A 100° C. melting point resin was prepared in a commercial operation by polymerizing a steam cracked fraction in the presence of aluminum chloride. To samples of this resin were separately added 0.05 wt. percent of various commercial masking agents and vanillin. The resulting blends were heated for five hours at 350° F. and solutions consisting of 25 wt. percent of the resin-masking agent blends in n-heptane were prepared. Paper strips were coated by immersion in the resin solutions. These test strips were dried in air and aged for 24 hours at 110° F. and then rated by a panel of three members according to a standard odor scale. The following results were obtained:

| Sample | Masking Agent | Ratings | | | |
|---|---|---|---|---|---|
| | | Panel Member #1 | Panel Member #2 | Panel Member #3 | Average |
| 1 | Vanillin | 2 Unobject | 1 Unobject | 1 Unobject | 1–3 Unobject. |
| 6 | None | | | | 6–8 Resin Odor. |

Code: 1-2—Very faint odor; 3-4—Faint odor; 5-6—Moderate odor; 7-8—Strong odor; 9-10—Very strong odor.

The above data clearly show that vanillin is outstanding in completely masking out the resin odor, the faint residual odor of vanillin itself being unobjectionable. In all other cases the odor of the resin was present to an objectionable degree. For instance, when no masking agent was used, an odor intensity of 6–8 was noticeable, and when other commercially available masking agents were used, the intensity varied from about 4 to 9.

Example II

Using resin from the same source as described in Example I, the following blends of resin, masking agent, and antioxidant were prepared:

| Sample No. | Masking Agent | Antioxidant | Percent Masking Agent | Percent Antiox. |
|---|---|---|---|---|
| 1 | Vanillin | Phenothiazine | .05 | .2 |
| 4 | do | Butylhydroxy Anisole | .05 | .2 |
| 7 | None | None | .05 | .2 |

These blends were heated for 5 hours at 350° F. after which paper test strips were coated with the resin blends by the same procedure outlined in Example I.

After heating for 24 hours at 110° F. the following conditions of odor intensity and type were noted:

| Sample No. | Odor Rating at 110° F. | | Odor Rating at Room Temp. | |
|---|---|---|---|---|
| | Intensity | Type | Intensity | Type |
| 1 | 4 | Faint vanillin odor | 2 | Faint vanillin odor. |
| 4 | 2 | Practically odorless | 2 | Practically odorless. |
| 7 | 8 | Resin odor | 6 | Resin odor. |

The above results clearly show that the presence of butyl hydroxy anisole renders the resin composition containing vanillin practically odorless, even at 110° F., indicating that the antioxidant has a synergistic effect on the masking qualities of the vanillin.

While the present invention is more specifically directed to the masking of the odor from steam-cracked resins, it may also be used to mask the odor from any type of hydrocarbon resin.

The nature of the present invention having been thus fully set forth and specific examples of the same given, what is claimed as new and useful and desirable by Letters Patent are:

1. An odor-stable composition which comprises in admixture a petroleum resin prepared by polymerizing in the presence of a Friedel-Crafts catalyst a steam-cracked fraction boiling in the range between 20 and 280° C. and consisting essentially of 12 to 30% diolefins, 45 to 62% olefins, and 0 to 36% aromatics, and 1 to 15% paraffins and naphthenes, said resin normally tending to develop an undesirable peroxidized odor upon standing; and 0.02 to 1.0 weight percent of vanillin.

2. The composition of claim 1 wherein 0.05 to 2 weight percent of butyl hydroxy anisole is also present.

3. An odor-stable composition which comprises in admixture a petroleum resin prepared by polymerizing in the presence of 0.25 to 2.5% of aluminum chloride a steam-cracked fraction boiling in the range between 20 and 280° C. and consisting essentially of 12 to 30% diolefins, 45 to 62% olefins, 0 to 36% aromatics, and 1 to 15% paraffins and naphthenes, said resin normally tending to develop an undesirable peroxidized odor upon standing; about 0.05 weight percent of vanillin; and about 0.2 weight percent of butyl hydroxy anisole.

References Cited in the file of this patent

UNITED STATES PATENTS

| | | |
|---|---|---|
| 2,364,027 | Marshall | Nov. 28, 1944 |
| 2,683,132 | Young et al. | July 6, 1954 |
| 2,698,463 | Conwell et al. | Jan. 4, 1955 |

FOREIGN PATENTS

| | | |
|---|---|---|
| 577,875 | Great Britain | June 4, 1946 |

OTHER REFERENCES

Foley: "Odorants in Rubber," India Rubber World, June 1, 1933, pages 30 and 39.